June 22, 1965  W. C. HUFFMAN  3,190,469
SILO UNLOADER

Original Filed Aug. 6, 1962  2 Sheets-Sheet 1

INVENTOR
WARREN C. HUFFMAN
BY
Williamson & Palmatier
ATTORNEYS

June 22, 1965   W. C. HUFFMAN   3,190,469
SILO UNLOADER

Original Filed Aug. 6, 1962
2 Sheets-Sheet 2

INVENTOR
WARREN C. HUFFMAN
BY
Williamson & Palmatier
ATTORNEYS 3,190,469
SILO UNLOADER
Warren C. Huffman, Winthrop, Minn.
Continuation of application Ser. No. 214,974, Aug. 6, 1962. This application Aug. 18, 1964, Ser. No. 391,362
9 Claims. (Cl. 214—17)

This is a continuation of application Serial No. 214,974, filed August 6, 1962, now abandoned.

This invention relates to apparatus for use in unloading material from a storage structure and more specifically to an apparatus for use in very effectively unloading fibrous particulate material, such as silage, from cylindrical storage structures such as silos and the like.

An object of this invention is to provide a novel apparatus, of simple and inexpensive construction and operation, for use in very effectively unloading fibrous material, such as silage, from cylindrical structures such as silos and the like, and including a first elongate conveyor means supported for horizontal circular travel upon the surface of the silage material within the storage structure, and a second conveyor means interconnected to the first conveyor means for relative movement therebetween and receiving material therefrom to convey the material outwardly of the silo.

Another object of this invention is to provide a novel apparatus of the class described having impelling means interposed between the respective conveyor means and being operable to cause smooth continuous flow of this material from one conveyor means to the other.

A more specific object of this invention is to provide a novel and improved apparatus for unloading particulate fibrous material, such as silage, from a cylindrical storage structure such as silos and the like, and including a pair of elongate conveyor mechanisms interconnected in cooperating relation, one of which extends outwardly of the silo for conveying material outwardly therefrom, and the other conveyor mechanism being supported by a driven wheel support structure for horizontal circular movement along the surface of the silage within the silo to thereby permit the silage to be uniformly and effectively unloaded from the silo.

Another object of this invention is to provide a novel unloading apparatus of the clas described having self-leveling means arranged in controlling relation with respect to at least one of the wheels of the wheel supported structure and being operable for maintaining the traveling conveyor mechanism in level relation with respect to the surface of the silage within the silo.

These and other objects and advantages of the invention will more fully appear from the following description made in connection with the accompanying drawings, wherein like character references refer to the same or similar parts throughout the several views, and in which.

Figure 1:
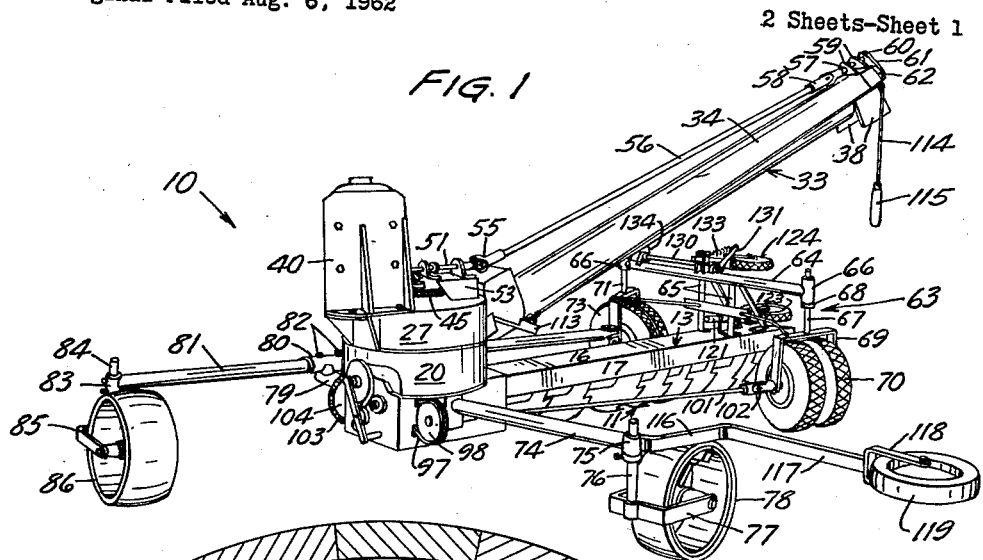
FIG. 1 is a perspective view of my invention.

Referring now to the drawings and more specifically to FIG. 1 is will be seen that one embodiment of my novel unloading apparatus, designated in its entirety by the reference numeral 10, is there shown.

Figure 4:
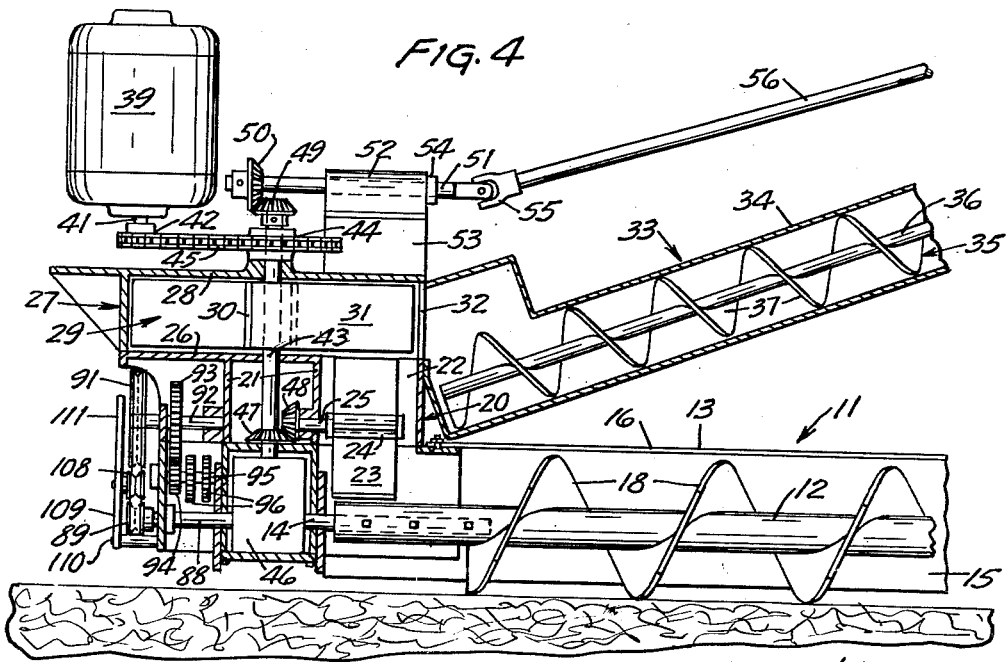
FIG. 4 is a detail cross sectional view illustrating the impelling means and drive means for the various components of my apparatus.

This silo unloading apparatus is provided with silage-engaging means for loosening and cutting and conveying the silage in the silo. In the form shown, such means includes an auger conveyor mechanism which is indicated in general by the numeral 11 and which includes an auger 11a comprised of a drum-shaped core or shaft 12 which is journaled for rotation at one end in the end plate of the auger housing 13. The other end of the core or shaft 12 is keyed or otherwise affixed to the end of the output shaft 14, as best seen in FIG. 6, which projects outwardly from a gear box comprising part of the drive mechanism to be described hereinbelow. It will be seen that the auger housing 13 includes a rear wall portion 15, a top wall portion 16, and a relatively short inclined front wall portion 17, as best seen in FIGS 1 and 4.

Figure 2:
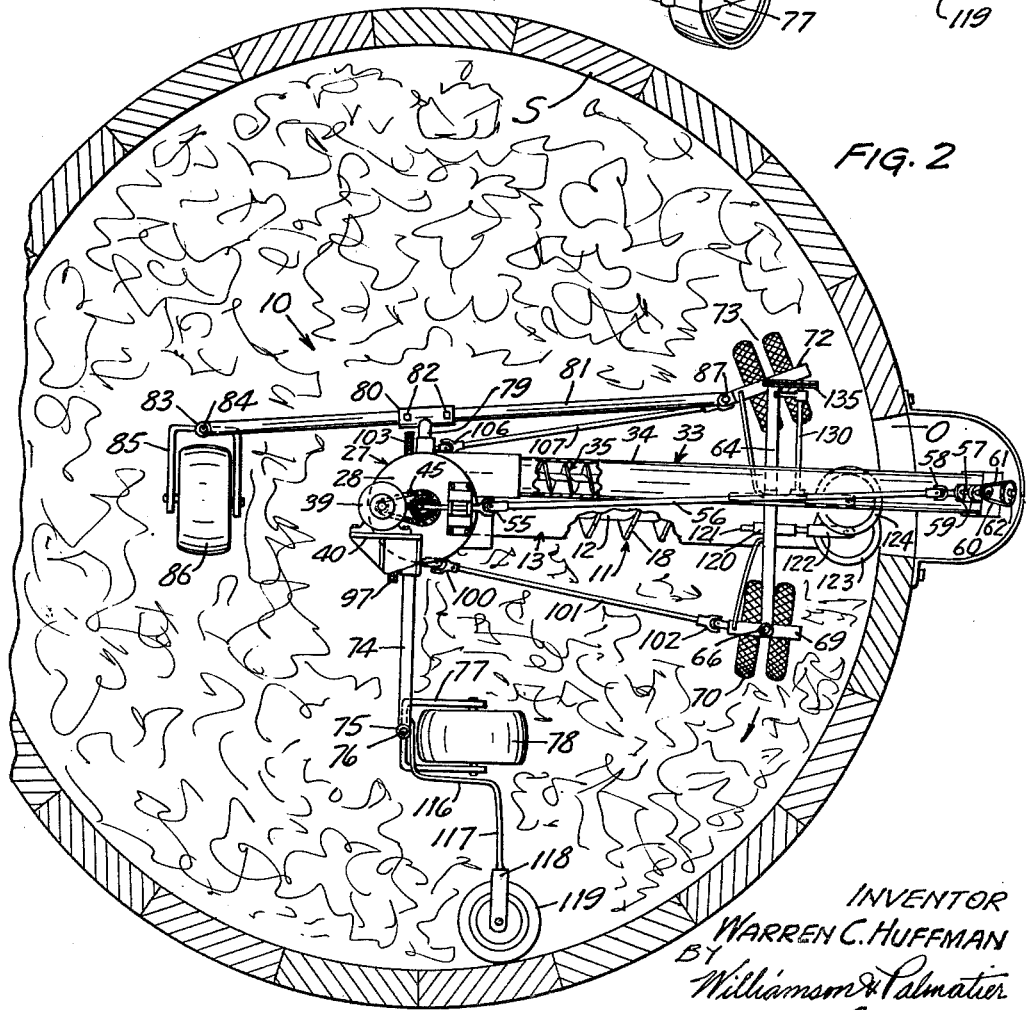
FIG. 2 is a top plan view of my invention with parts thereof broken away for clairity and with the apparatus shown in cooperating relation within a silo structure.

The auger shaft 12 has a helix or helically shaped blade 18 affixed thereto and extending helically substantially throughout the length thereof. This helical blade 18 has a plurality of teeth 19 formed in the outer edge thereof. It will be noted that the teeth 19 project outwardly into close proximity with the interior wall surface of the housing 13 and cooperate with the latter for cutting and conveying the silage and material toward that end of the conveyor mechanism 11 which is disposed substantially in the center of the silo, as best seen in FIG. 2.

A housing 20 is affixed to one end of the auger housing 13 and this housing 20 has a pair of spaced-apart vertically extending plates 21 which divide the housing into suitable compartments. One of these compartments constitutes an impelling chamber 22 which is arranged in communicating relation with the housing 13, as best seen in FIG. 4. A rotary multi-blade impeller 23 is revolvably mounted in the chamber 22 and cooperates with the end of the auger mechanism 11 for impelling the silage conveyed by the auger upwardly therefrom. This impeller is provided with a hub 24 to which the blades are secured and which in turn is secured to a shaft 25 which is journaled for rotation in one of the plates 21.

Referring again to FIG. 4 it will be seen that the housing 20 is provided with a top plate 26 having a suitable opening therein to permit the silage material impelled by the multi-bladed impeller 22 to be impelled therethrough. Another housing 27 is mounted upon the housing 20 to permit relative rotation between these respective housings. It will be seen that housing 27 is provided with a peripheral wall and a top plate 28. The housing 27 is positioned upon the top plate 26 of the housing 20 and has a multi-bladed impeller 29 revolvably mounted thereon for rotation about a substantially vertical axis. It will be noted that the impeller 29 includes a substantially vertically disposed cylindrical hub 30 having a plurality of flat blades 31 affixed thereto and extending radially outwardly therefrom. The ends of the blades are disposed in close proximity to the peripheral wall of the housing 27 and receive and impel the material impelled upwardly by the impeller 22 laterally outwardly from the housing 27 through an opening 32, as best seen in FIG. 4.

An elongate auger conveyor mechanism 33 is secured to the housing 27 and extends angularly upwardly therefrom. This auger mechanism 33 includes an elongate closed auger housing 34 having one end connected to the housing 27 so the opening in the latter is in communicating relation with the opening in the auger housing. The other end of the auger housing extends outwardly through the opening in the wall of the silo and projects upwardly at an angle from the housing 27.

Revolvably mounted within the auger housing 34 is an auger conveyor blade 35 which has one end journaled for rotation in the outer end wall of the auger housing 34. It is pointed out that this auger blade 35 is supported from its outer end only and when revolved causes the material impelled into the auger housing 34 from the multi-bladed impeller 29 to be conveyed away from the housing 27. The auger conveyor 35 includes a shaft 36 having a helical blade 37 rigidly affixed thereto. The outer end of the auger housing 34 is provided with a downwardly opening discharge aperture having side plates 38 depending from opposite sides thereof. Thus it will be seen that the silage material which is cut and conveyed by the auger conveyor mechanism 11 will be impelled upwardly by the impeller 22 and then laterally by the impeller 29 and thereafter upwardly and outwardly of the silo by the auger conveyor mechanism 33.

Means are provided for drivingly revolving the auger conveyor mechanisms and the respective impellers and the motive power for such a drive is supplied by an electric motor 39 which is mounted on the housing 27 by means of a suitable motor support bracket 40. The motor 39 is provided with a drive shaft 41 having a drive sprocket 42 affixed to the end thereof and it will be noted that the electric motor 39 is supported by the bracket 40 so that the drive shaft 41 is vertically disposed. An elongate vertically disposed shaft 43 has its upper end projecting upwardly beyond the top plate 28 of the housing 27 and has its other end projecting downwardly into the housing 20. A relatively large driven sprocket 44 is affixed to the shaft 43 adjacent the upper end portion thereof and an endless drive chain 45 is trained around the sprockets 42 and 44 so that when the drive shaft 41 of the motor is revolved, then the shaft 43 is revolvably driven. The relative difference in the sizes of the sprockets 42 and 44 serve as a speed reducing means for the shaft 43.

Referring again to FIG. 4 it will be seen that the shaft 43 projects downwardly into a gear box 46 which is mounted between the plates 21 of the housing 20. The gear box 46 is of conventional construction and is provided with conventional gear trains to suitably reduce the speed of the output shaft 14. Thus it will be seen that the auger conveyor drive shaft 14, is driven by the motor 39 through the shaft 43 and gear box 46.

The hub 30 of the impeller 29 is keyed to an intermediate portion of the shaft 43 and revolves with the shaft 43. Thus the impeller 29 is driven directly by the shaft 43 when the motor 39 is energized. A bevel gear 47 is affixed to the lower end portion of the shaft 43 and is disposed exteriorly of the gear box 46. This bevel gear 47 enmeshes with another bevel 48, the latter being carried by the shaft 25. It will therefore be seen that the impeller shaft 25 is driven by the vertical driven shaft 43 through the enmeshing gears 47 and 48.

Means are also provided for supplying drive to the outer end of the auger conveyor 35. This means includes a bevel gear 49 which is keyed to the upper terminal portion of the shaft 43 and which is disposed in enmeshing relation with a bevel gear 50, the latter being secured to one end of an elongate shaft 51. It will be seen that shaft 51 is horizontally disposed and is journaled in a suitable bearing 52, the latter being supported by a support bracket 53 affixed to the top plate 28 of housing 27. A cross collar 54 is keyed to the shaft 51 and prevents axial movement of the shaft 51 in a direction to cause disengagement of the gear 50 from the gear 49.

The shaft 51 has its other end connected by means of a universal joint 55 to one end of an elongate driven shaft 56. Referring now to FIG. 1 it will be seen that the outer end of the shaft 56 is connected to one end of a shaft 57 by means of a universal joint 58. This shaft 57 is revolvably supported by suitable bearings 59, the latter being carried by the auger housing 34. The end of the shaft 57 has a sprocket 60 keyed thereto and an endless drive chain 61 trained around sprocket 60 and a slightly larger sprocket 62 which in turn is carried by the outer end of the auger conveyor 35. It will therefore be seen that the auger conveyor 35 is driven at its outer end from the motor 39 through the shafts 51, 56 and 57.

Means are also provided for supporting the auger conveyor mechanism 11 for travel upon the surface of the silage within the silo so that even unform unloading of this silage may be achieved. This means includes a mobile support structure designated generally by the reference numeral 63 and comprised of a transversely extending generally horizontally disposed wheel supporting arm 64 which is rigidly secured to the top wall portion 16 of the auger housing 13 by means of a plurality of vertically extending attachment bars 65. The wheel support arm 64 extends in fore-and-aft direction with respect to the direction of travel of the apparatus 10 and the respective front and rear ends thereof have vertical sleeves 66 affixed thereto. The sleeve at the front end of the wheel support arm 64 receives a vertically extending wheel standard 67 therethrough. This standard has a stop collar 68 affixed to the end portion thereof and this collar serves to prevent vertical movement of the standard through the sleeves 66 beyond a predetermined point.

The lower end portion of the drive wheel standard 67 has an inverted U-shaped supporting bracket or yoke 69 secured thereto which supports the driven axle of the driven front wheel unit 70 therethrough. It will be noted that the U-shaped support yoke 69 supports a pair of tire-mounted drive wheels 70 which are arranged in side-by-side relation.

The rear sleeve 66 mountably receives the vertically extending wheel standard 71 therethrough and it is pointed out that this wheel standard 71 has no stop collar and is therefore freely vertically slidable in the sleeve 66. The lower end portion of the standard 71 is also secured to an inverted U-shaped wheel supporting yoke or bracket 72 which is of substantially identical construction to the U-shaped wheel supporting yoke 69. The rear drive wheel unit 73 has its axle journaled for rotation in the depending arms of the U-shaped wheel supporting yoke 72 and this rear wheel unit is also constructed of a pair of tire-mounted wheels arranged in side-by-side relation.

The mobile support structure also includes an elongate caster wheel supporting arm 74 which is affixed to the housing 20 and projects outwardly therefrom. A vertical sleeve 75 is carried by the outer end of the arm 74 and receives a caster wheel standard 76 therethrough. The caster wheel standard 76 has a generally U-shaped caster wheel support yoke or bracket 77 affixed to the lower end thereof. The outer ends of the axle of the caster wheel 78 are suitably journaled in the support bracket 77 in a well known manner.

An attachment bracket 79, as best seen in FIGS. 1 and 2, is secured to the opposite side of the housing 20 and carries a sleeve 80 at the outer end thereof. The sleeve 80 slidably receives an elongate caster wheel support arm 81 therethrough and this support arm is maintained in a fixed relation with respect to the sleeve 80 by means of suitable set screws 82. It will be noted that the caster support arm 81 is disposed substantially parallel with respect to the auger conveyor mechanism 11 and that the arm has a vertically extending sleeve 83 affixed to one end thereof. The sleeve 83 slidably receives the upper end of a caster wheel standard 84 therethrough, the lower end of the standard being secured to a U-shaped caster wheel support bracket 85 for supporting the axle of a caster wheel 86 therein. The caster wheel 86 and support bracket therefor are of substantially identical construction to that of caster wheel 78 and it is pointed out that both of the caster wheels 78 and 86 respectively are mounted to revolve or pivot about a substantially vertically extending axis defined by their respective standards.

The other end of the arm 81, as best seen in FIG. 2, is pivotally connected as at 87 to one of the arms of the U-shaped drive wheel support bracket 72. Thus the angulated relation of the rear drive wheel unit 73 may be readily adjusted.

The front drive wheel unit 70 and the rear wheel unit 73 are provided with drive means for driving these drive wheel units to thereby move the auger conveyor mechanism 11 in a circular path over the surface of the silage within the silo. Referring now to FIG. 4 it will be seen that the gear box 46 is provided with an output shaft 88 which projects outwardly beyond the housing 20 and which has a relatively small pulley 89 keyed thereto for rotation therewith. The pulley 89 has an endless drive belt 90 trained therearound and this drive belt is also trained around a larger pulley 91 which is keyed to a shaft 92 journaled for rotation in the housing 20. The shaft 92 has a relatively large gear 93 keyed thereto and this gear 93 is disposed in enmeshing relation with a smaller gear 94 which is affixed to a shaft 95. The shaft 95 is also journaled for rotation within the housing 20 and this shaft has a pair of drive sprockets 96 keyed thereto for rotation therewith.

One of the drive sprockets 96 has an endless chain 97 trained therearound and this chain is also trained around a larger driven sprocket 98 which is affixed for rotation with a shaft 99 journaled for rotation in the housing 20. The shaft 99 is connected through a universal joint 100 to a shaft 101 which in turn is connected through another universal joint 102 to the axle of the front drive wheel unit 70. Thus it will be seen that the front drive wheel unit 70 will be driven when the shaft 101 is revolved.

The other of the drive sprockets 96 has an endless chain 103 trained therearound and this chain is also trained around a larger driven sprocket 104 which is keyed to a shaft 105. The shaft 105 is connected through a universal joint 106 to a shaft 107 which in turn is connected through a universal joint to the rear drive wheel unit 73.

Figure 3:
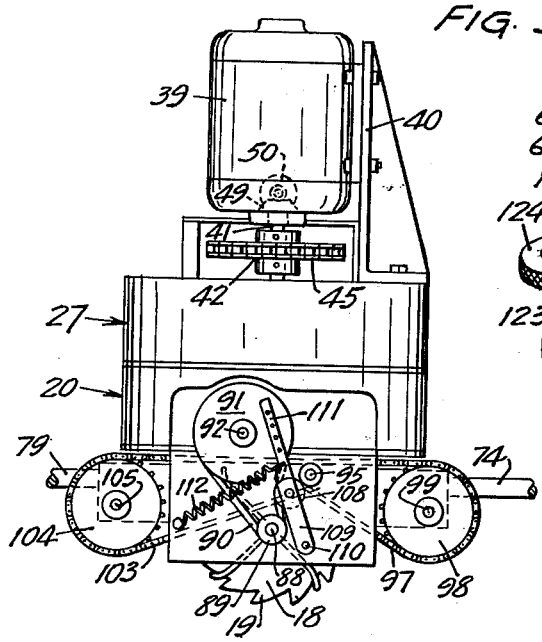
FIG. 3 is an end elevational view on an enlarged scale of a portion of my novel apparatus.
Figure 5:
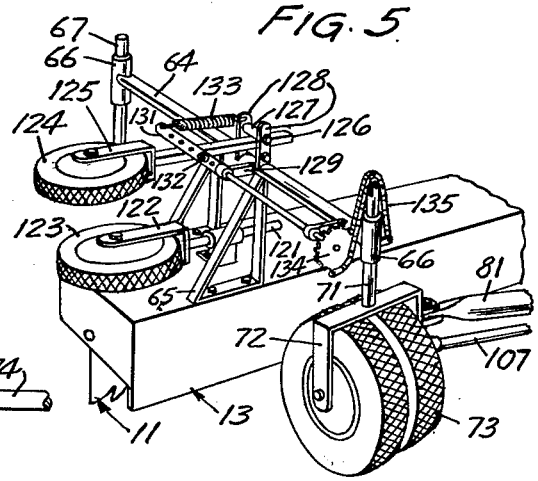
FIG. 5 is a perspective view on an enlarged scale of the mobile support frame leveling mechanism.

Thus it will be seen that not only will the auger mechanisms and the impellers be driven when the electric motor 39 is energized but the entire apparatus will be moved along the surface of the silage in the silo. Means, however, are provided for disengaging the drive to the front wheel and rear wheel drive units and this means includes a belt tightener pulley 108 which is carried by the upper end of an arm 109 pivotally secured to the housing 20 by pivot pin 110. The arm 109 has an extension arm 111 secured thereto and projecting upwardly therefrom, as best seen in FIG. 3. This extension arm 111 has one end of a tension spring 112 secured thereto, the end of the spring extending through a selected one of the apertures therein. The other end of the spring 112 is secured by means of a lug to the housing 20. Thus the spring 112 normally urges the arm 109 about the pivot pin 110 in a direction to cause the belt tightener pulley 108 to be urged into belt tightening relation with respect to the belt 90. Thus the large pulley 91 will be normally connected in driven relation with respect to the drive pulley 89.

It will be seen that when the arm 109 is pivoted in a clockwise direction, as viewed in FIG. 3, the belt tightener pulley 108 will be moved out of tightening relation with respect to the drive belt so that insufficient tension will be exerted on the drive belt 90 to permit driving of the pulley 91. Therefore the driving connection to the respective front and rear drive wheel units will be rendered inoperative.

Means are provided for permitting an operator positioned outside the silo structure to cause pivoting movement of the extension arm 111 so that the belt tightener pulley 108 will be shifted in a direction to loosen the belt 90. To this end, it will be seen that a link 113, as best seen in FIG. 1, is pivoted to the auger housing 34 and is movable between a vertical operative and an elevated inoperative position. The link 113, as illustrated in FIG. 1, is in the elevated inoperative position so that the travel of the auger conveyor mechanism 11 and housing 20 relative to the housing 27 and the auger conveyor mechanism 33 will not cause the extension arm 111 and the link 113 to interengage each other. However, when the link 113 is moved to the vertical operative position, the link will be disposed in obstructing relation with respect to the path of movement of the extension arm as the apparatus move in the direction of the arrow. The arm 111 will therefore be engaged by the link 113 which will cause shifting of the pulley in a clockwise direction and subsequent loosening of the drive belt 90.

The link 113 has an elongate flexible element or rope 114 connected thereto and free end of the rope has a weight 115 secured thereto so that this free end of the rope will depend from the silo when the rope is trained around a support element carried by the outer end of the auger housing 34. It will be seen that the weight 115 normally urges the link 113 to the elevated inoperative position but that when the tension is relieved to cause the link to be moved to the operative vertical position, the drive to the front and rear wheel units will be rendered inoperative. Therefore when the drive to the front and rear wheel drive units is disengaged even if the motor 39 is energized, the conveyor mechanism 11 will not be moved in a rotary path over the silage in the silo. It will be noted, however, that the conveyor mechanism 11, the conveyor mechanism 33 as well as the respective impellers will be driven so that the material within the unloading apparatus may be removed.

Means are also provided for maintaining the auger conveyor mechanism 11 and mobile support structure in spaced relation with respect to the interior wall surface of the silo and for also guiding this conveyor mechanism and mobile support structure in the circular path or movement thereof. To this end it will be seen that the outer terminal portion of the caster wheel support arm 74 is provided with an angularly bent arm 116 which has an offset portion 117 projecting outwardly therefrom, the latter terminating in a U-shaped guide wheel support bracket or yoke 118. The opposite ends of a vertically disposed guide wheel axle are journaled for rotation in the U-shaped support bracket 118 to permit the guide wheel 119 to freely revolve about a substantially vertical axis. It will be seen that this guide wheel 119 is in bearing engagement with the inner surface of the wall of the silo.

The outer terminal portion of the auger housing 27 has a bracket secured thereto and which terminates at its upper end in a sleeve 120 having its bore arranged substantially parallel to the generally longitudinal axis of the auger conveyor mechanism 11. This sleeve 120 adjustably receives an elongate guide wheel standard 121 therein and this wheel standard has a U-shaped guide wheel support bracket 122 rigidly connected to the outermost end thereof. The opposite ends of the axle of guide wheel 123 are journaled for rotation in the U-shaped bracket 122 and it will be seen that guide wheel 123 is also disposed in bearing engagement with the inner surface of the wall of the silo. It will be noted that the guide wheel 123 is disposed in angular spaced relation with respect to the guide wheel 119 and that the spacing defined by the arcuate inner circumferential wall of the silo is approximately 90 degrees.

When the mobile support structure 63 is moving along the surface of the silage within the silo, it is necessary to maintain the auger conveyor mechanism 11 in substantially horizontal relation. However, the upper surface of the silage within the silo is not always level. Therefore, in order to maintain the auger conveyor mechanism in substantially level condition even though the mobile support apparatus is moved over an irregular contoured surface, self-leveling means are provided which are operable to cause relative vertical shifting of the rear drive wheel unit 73.

This self-leveling means includes a wall-engaging wheel 124 which is disposed in substantially horizontal relation and has its vertically disposed axis journaled for support in the U-shaped wheel supporting yoke or bracket 125. This U-shaped wheel supporting bracket 125 has an elongate generally horizontally disposed wheel standard 126 rigidly secured thereto and projecting therefrom. The free end of the wheel standard 126 extends between a pair of vertically spaced-apart roller elements 127 which are revolvably supported between a pair of upstanding roller supporting brackets 128. It will be seen that these roller supporting brackets are rigidly secured to the wheel support arm 64 intermediate the ends thereof.

The wheel support arm 64 also has a small arm 129 rigidly affixed thereto and projecting outwardly therefrom in close proximity to the support bracket 128. An elongate revolvable leveling bar 130 is journaled for rotation in the small arm 129 and this elevating bar 130 has an arm 131 rigidly connected thereto for movement therewith. It will be noted that this arm 131 has a plurality of apertures therein and it will also be noted that the wheel standard 126 has a plurality of apertures therethrough. A pivot pin 132 pivotally connects the arm 131 with the wheel standard 126 and extends through a selected pair of registering apertures in said wheel standard and arm respectively. An elongate tension spring 133 has one end thereof connected to the free end of arm 131 and the other end thereof connected to one of the support brackets 128. Thus it will be seen that the spring 133 tends to urge the arm 131 in a direction towards the center of the silo.

The opposite ends of the elevating or self-leveling bar 130 has a sprocket 134 secured thereto which is revolvable therewith. An elongate self-leveling chain member 135 has one end thereof secured to the sprocket 134 and has the other end thereof secured to the sleeve 66 of the rear drive wheel unit 73. It is pointed out that the chain 135 engages the peripheral edge of the sprocket 134 and is wound upon the sprocket when the latter is revolved. It will therefore be seen that when the wheel 124 coacts with the inner wall surface of the silo to impart a thrust upon the wheel standard 126 so that the arm 131 is angularly moved, the elevating or self-leveling bar 130 will also be angularly moved to cause similar angular or revolving movement of the sprocket 134. Thus the self-leveling chain 135 will be wound upon sprocket 134 to cause relative sliding movement between the sleeve 66 and the wheel standard 71. Inasmuch is the wheel support arm 64 is rigidly connected to the conveyor mechanism 11, this conveyor mechanism 11 will be maintained in substantially level condition even though the guide wheel units are disposed at different elevations.

During operation of my silo unloading apparatus 10, the apparatus will be positioned within the silo and upon the upper surface of the silage therein. The guide wheels 119 and 123 will be positioned in engaging relation with respect to the inner wall surfaces of the silo S so that the housing 20 and housing 27 are located approximately at the center of the silo. With this arrangement, the conveyor mechanism 11 approximates the radius of the internal diameter of the silo. The conveyor mechanism 33 will be positioned so that the discharge opening therein extends through the conventional opening O of the silo.

The belt tightener pulley 108 will be disposed in engaging relation with the drive belt 90 so that the pulley 91 and shaft 92 are driven by the drive pulley 89. Thereafter the motor 39 is energized and the auger conveyor blade 18 will cut, loosen and convey the fibrous particulate silage material towards the center so that the material will be received first by the impeller 123 and thereafter by the impeller 129. This silage will then be conveyed by the auger conveyor mechanism 33 outwardly through the opening O of the silo. Travel of the conveyor mechanism 11 in a circular path causes the silage to be very evenly and uniformly removed from the top downwardly. It will be appreciated that the teeth 19 of the auger blade 18 serve to very effectively cut through the silage material in the event this silage is frozen.

When operation of the silage unloading apparatus 10 is stopped, the link 113 is moved to the vertical operative position so that the drive to the front and rear drive wheel units is rendered inoperative. This permits the silage material located in the conveyor mechanisms and impellers to be completely removed from the apparatus. After the removal of such silage material, the motor 39 is de-energized and the link 113 is elevated into the inoperative position so that the apparatus is then in condition for drive.

From the foregoing it will be seen that I have provided a novel and improved silo unloading apparatus including a pair of conveyor mechanisms connected by impeller means to permit continuous and effective controlled flow of the silage material from the apparatus during the unloading operation.

It will also be seen from the preceding paragraphs that my novel silo unloading apparatus is provided with a uniquely arranged drive means for not only driving the conveyor and impeller means but also for driving the mobile support structure.

It will also be seen from the foregoing description that my novel unloading apparatus is also provided with a novel self-leveling means so that not only is efficient unloading accomplished but the tendency for malfunction and damage to the machine to occur is greatly diminished.

Thus it will be seen that I have provided a silo unloading apparatus which is not only of simple and inexpensive construction and operation but one which functions in a more efficient manner than any heretofore known comparable device.

It will, of course, be understood that various changes may be made in the form, details, arrangement and proportions of the various parts without departing from the scope of my invention.

What is claimed is:

1. Silo unloading apparatus for use in unloading silage from silos, said apparatus comprising an elongate horizontally oriented auger type cutter and conveyor mechanism for cutting and conveying silage material longitudinally of said mechanism, a mobile support structure supporting said cutter and conveyor mechanisms for horizontal travel upon the surface of the silage material within the silo and with one end of said conveyor mechanism positioned adjacent the center of the silo and the other end thereof being disposed adjacent the inner wall surface of the silo, means for driving said mobile support structure to swing said conveyor mechanism about said one end thereof in a circular horizontal path, a second elongate conveyor mechanism having one end thereof disposed in close proximity to said one end of said first mentioned conveyor mechanism and having its other end thereof projecting outwardly through an opening in the silo, impeller means interposed between the respective one ends of said conveyor mechanisms and including a pair of multi-bladed rotating impellers arranged in close cooperative relation, one of said bladed impellers being revolvable about a horizontal axis disposed above said first conveyor mechanism and the other of said bladed impellers positioned above said one impeller and being revolvable about a vertical axis, said multi-bladed impellers cooperating with each other to receive and impel the material from said first mentioned conveyor mechanism to said second mentioned conveyor mechanism whereby the silage is conveyed outwardly of the silo.

2. Silo unloading apparatus for use in unloading silage from silos and the like, said apparatus comprising an elongate horizontally oriented auger type cutter and conveyor mechanism for cutting and conveying silage material longitudinally of said mechanism, a mobile support structure supporting said cutter and conveyor mechanism for travel upon the surface of the silage within the silo and with one end of said conveyor mechanism positioned closely adjacent the center of the silo and the other end thereof being disposed adjacent the inner wall surface of the silo, means for driving said mobile support structure to swing said conveyor mechanism about said one end thereof in a circular horizontal path, a second elongate conveyor mechanism disposed above said first mentioned conveyor mechanism and having one end thereof disposed closely adjacent said one end of said first mentioned conveyor mechanism and having its other end projecting outwardly through an opening in the silo, chamber defining structure in addition to and carried by said one end of the first mentioned conveyor mechanism and being movable therewith, a multi-bladed rotary impeller mounted within said chamber defining structure for revolving movement about a substantially horizontal axis disposed above the axis of said first mentioned conveyor mechanism and being operable to receive and vertically impel the silage from said first mentioned conveyor mechanism, chamber defining structure carried by said one end of said second mentioned conveyor mechanism and being disposed above and connected in communicating relation with said first mentioned chamber defining structure for relative movement therebetween, a multi-bladed rotary impeller mounted for rotation within said second mentioned chamber defining structure for rotation about a substantially vertical axis and positioned above and cooperating with said first mentioned impeller to receive the silage therefrom and to convey the silage to said second mentioned conveyor mechanism.

3. Silo unloading apparatus for use in unloading silage from a silo, said apparatus comprising an elongate horizontally oriented auger type cutter and conveyor mechanism for cutting and conveying silage material longitudinally of said mechanism, a second elongate conveyor mechanism disposed above said first mentioned conveyor mechanism and having one end thereof disposed in close proximity to one end of said first mentioned conveyor mechanism, and having its other end projecting outwardly through an opening in the silo, impeller means including a pair of housing structures one of which is carried by one end of the first mentioned conveyor mechanism and the other housing structure being carried by said one end of the second mentioned conveyor mechanism, a pair of rotary multi-bladed impellers each positioned in one of said housing structures, one of said impellers being revolvable about a substantially horizontal axis disposed above the axis of rotation of said first mentioned conveyor mechanism, the other of said impellers being positioned above said one impeller and being revolvable about a substantially vertical axis, whereby said impellers cooperate with each other to receive and impel the material from the first mentioned conveyor mechanism to the second mentioned conveyor mechanism, means connecting said first and second conveyor mechanisms for relative movement therebetween, mobile support structure supporting said first mentioned conveyor mechanism for travel upon the surface of the silage within the silo so that one end of said first mentioned conveyor mechanism is positioned adjacent the center of the silo and with the other end thereof being disposed adjacent the inner wall surface of the silo, said mobile support structure including a plurality of vertically disposed wheel members engaging the surface of the silage material in the silo for travel thereupon, power means having driving connections with said conveyor mechanisms, impellers and at least one of said wheel members to drive the same, and means for disengaging the drive connection to said driven wheel member while permitting said impellers and said conveyor mechanisms to remain interconnected in driven relation with said power means.

4. The structure as defined in claim 3 and a plurality of revolvable guide members carried by said first mentioned conveyor mechanism and engaging the inner wall surface of the silo for guiding the first mentioned conveyor mechanism during angular movement thereof.

5. Silo unloading apparatus for use in unloading silage from a silo, said apparatus comprising an elongate horizontally oriented auger type cutter and conveyor mechanism for cutting and conveying silage material longitudinally of said mechanism, a second elongate conveyor mechanism disposed above said first mentioned conveyor mechanism and having one end thereof disposed in close proximity to the one end of said first mentioned conveyor mechanism, and having its other end projecting outwardly through an opening in the silo, chamber defining structure in addition to and carried by said one end of the first mentioned conveyor mechanism and being movable therewith, a multi-bladed rotary impeller mounted within said chamber defining structure for revolving movement about a substantially horizontal axis disposed above the axis of rotation of said first mentioned conveyor mechanism and being operable to receive and vertically impel silage from said first mentioned conveyor mechanism, chamber defining structure disposed above said first mentioned chamber defining structure carried by one end of said second mentioned conveyor mechanism and being connected in communicating relation with said first mentioned chamber defining structure for relative movement therebetween, a multi-bladed rotary impeller mounted for rotation within said second mentioned chamber defining structure for rotation about a substantially vertical axis and disposed above and cooperating with said first mentioned impeller to receive the silage therefrom and to convey the silage to said second mentioned conveyor mechanism, mobile support structure interconnected with said first mentioned conveyor mechanism to support the same for travel upon the surface of the silage within the silo, one end of said first mentioned conveyor mechanism is positioned adjacent the center of the silo and with the other end thereof being disposed adjacent the inner wall surface of the silo, said mobile support structure including a plurality of vertically disposed wheel members engaging the surface of the silage material in the silo for travel thereupon, drive means mounted on said chamber defining structure and having driving connections to said conveyor mechanisms and said impellers to drive the same, means defining a separate drive transmitting connection between said drive means and said wheel member to drive the latter, and means for shifting said drive transmitting connection into and out of drive transmitting relation with said wheel member while permitting the drive connection to said impellers and said conveyor mechanisms to remain in driven relation with respect to said drive means.

6. The apparatus as defined in claim 5 and an actuating member carried by said second mentioned conveyor mechanism and being operable to actuate said drive transmitting disconnecting means to shift the drive transmitting connection to said wheel member out of driving relation therewith.

7. Silo unloading apparatus for use in unloading silage from a silo, said apparatus comprising an elongate cutter and conveyor mechanism for cutting and conveying silage material longitudinally of said mechanism, a second elongate conveyor mechanism disposed above said first mentioned conveyor mechanism and having one end thereof disposed in close proximity to one end of said first mentioned conveyor mechanism, and having its other end projecting outwardly through an opening in the silo, impeller means including a pair of multi-bladed rotary impellers one of which is carried by said one end of the first mentioned conveyor mechanism and the other impeller being carried by said one end of the second mentioned conveyor mechanism, the respective axis of rotation of said impellers being arranged in angulated relation with respect to each other whereby said impellers cooperate with each other to receive and impel the silage material from the first mentioned conveyor mechanism to the second mentioned conveyor mechanism, means interconnecting said first and second mentioned conveyor mechanisms for relative movement therebetween, mobile support structure interconnected with said first mentioned conveyor mechanism to support the same for horizontal circular travel upon the surface of the silage within the silo about said one end of said first mentioned conveyor mechanism, said one end of said first mentioned conveyor mechanism being positioned adjacent the center of the silo and the other end thereof being swingable in close proximity to the inner wall surface of the silo, said mobile support structure including a pair of spaced-apart vertically disposed wheel members positioned on opposite sides of said first mentioned conveyor mechanism adjacent the other end thereof and engaging the surface of the silage material within the silo for travel thereupon, drive means having driving connections with said conveyor mechanisms, impellers and at least one of said wheel members to drive the same, and conveyor mechanism leveling means including a horizontally oriented wheel shiftably mounted on said mobile support structure and engaging the inner wall surface of the silo, mechanism interconnecting said wall-engaging wheel with one of said wheel members to cause relative vertical shifting movement between said wheel members in response to shifting movement of said wall-engaging wheel in a direction radially of the path of travel of said apparatus to thereby permit said first mentioned conveyor mechanism to be maintained in substantially horizontal relation.

8. Silo unloading apparatus for use in unloading silage from a silo, said apparatus comprising an elongate horizontally oriented auger type cutter and conveyor mechanism for cutting and conveying silage material longitudinally of said mechanism, a second elongate conveyor mechanism disposed above said first mentioned conveyor mechanism and having one end thereof disposed in close proximity to one end of said first mentioned conveyor mechanism, and having its other end projecting outwardly through an opening in the silo, impeller means including a pair of multi-bladed rotary impellers one of which is carried by one end of the first mentioned conveyor mechanism and the other impeller being carried by the one end of the second mentioned conveyor mechanism, the axis of rotation of said one impeller being disposed above and substantially parallel to the longitudinal axis of said first mentioned conveyor mechanism, and said other impeller being disposed above said one impeller and having a vertical axis of rotation whereby said impellers cooperate with each other to receive and impel the silage material from the first mentioned conveyor mechanism to the second mentioned conveyor mechanism, means interconnecting said first and second mentioned conveyor mechanisms for relative movement therebetween, mobile support structure interconnected with said first mentioned conveyor mechanism to support the same for horizontal circular travel upon the surface of the silage within the silo about said one end of said first mentioned conveyor mechanism, said one end of said first mentioned conveyor mechanism being disposed adjacent the center of the silo and the other end thereof being swingable in close proximity to the inner wall surface of the silo, said mobile support structure including a pair of spaced-apart vertically disposed wheel members positioned on opposite sides of and in supporting relation with said first mentioned conveyor mechanism adjacent the other end thereof and engaging the surface of the silage material within the silo for travel thereupon, drive means having driving connections with said conveyor mechanisms, impellers and at least one of said wheel members to drive the same, and means for automatically maintaining said first mentioned conveyor mechanism in horizontal level relation during travel thereof, said conveyor leveling means including an elongate, horizontally oriented wheel standard shiftably mounted on said mobile support structure for movement relative thereto and having a horizontally disposed wall-engaging wheel revolvably supported at one end thereof, elevating mechanism interconnecting said wheel standard with one of said conveyor supporting wheel members and being operable in response to longitudinal movement of said wheel standard to cause vertically shifting of said one wheel member whereby said first mentioned conveyor mechanism will be maintained in substantially horizontal relation during circular travel thereof on the surface of the silage in the silo.

9. Silo unloading apparatus for use in unloading silage from a silo, said apparatus comprising an elongate cutter and conveyor mechanism for cutting and conveying silage material longitudinally of said mechanism, a second elongate conveyor mechanism disposed above said first mentioned conveyor mechanism and having one end thereof disposed in close proximity to one end of said first mentioned conveyor mechanism, and having its other end projecting outwardly through an opening in the silo, a first rotary impeller mechanism positioned adjacent said one end of said first mentioned conveyor mechanism and being revolvable about a susbtantially horizontal transverse axis, said first impeller mechanism having a plurality of substantially flat blades which during rotation thereof receive and impel the silage material upwardly from said one end of said first mentioned conveyor mechanism, a second multi-bladed rotary impeller mechanism revolvably mounted about a substantially vertical axis and being spaced above said first impeller mechanism and adjacent said one end of said second mentioned conveyor mechanism, said second impeller mechanism receiving silage material from said first impeller mechanism and impelling said silage material to said one end of said second mentioned conveyor mechanism, means interconnecting said first and second mentioned conveyor mechanisms for relative movement therebetween, mobile support structure interconnected with said first mentioned conveyor mechanism to support the same for horizontal circular travel upon the surface of the silage within the silo about said one end of said first mentioned conveyor mechanism, said one end of said first mentioned conveyor mechanism being positioned adjacent the center of the silo and the other end thereof being swingable in close proximity to the inner wall surface of the silo, said mobile support structure including a pair of spaced-apart vertically disposed wheel members positioned on opposite sides of said first mentioned conveyor mechanism adjacent the other end thereof and engaging the surface of the silage material within the silo for travel thereupon, drive means having driving connections with said conveyor mechanisms, impeller mechanisms and at least one of said wheel members to drive the same, and means for automatically maintaining said first mentioned conveyor mechanism in horizontal level relation during travel thereof, said conveyor leveling means including an elongate horizontally oriented wheel standard mounted on said mobile support structure for longitudinal movement relative thereto in a direction generally radially of the path of travel of said apparatus, a horizontally disposed wall-engaging wheel revolvably supported at one end of said wheel standard, and elevating mechanism interconnecting said wheel standard with one of said conveyor supporting wheel members and being operable in response to longitudinal movement of said wheel standard to cause vertical shifting movement of said one wheel member whereby said first mentioned conveyor mechanism will be maintained in substantially horizontal relation during circular travel thereof upon the surface of the silage material in the silo.

References Cited by the Examiner

UNITED STATES PATENTS

| | | | |
|---|---|---|---|
| 2,651,438 | 9/53 | Peterson | 214—17 X |
| 2,719,058 | 9/55 | Van Dusen | 214—17 X |
| 2,794,560 | 6/57 | Buschbom | 214—17 |
| 2,858,033 | 10/58 | Hofer | 214—17 |
| 3,017,045 | 1/62 | Soehl et al. | 214—17 |
| 3,065,996 | 11/62 | Patz et al. | 214—17 X |

HUGO O. SCHULZ, *Primary Examiner.*